No. 875,493. PATENTED DEC. 31, 1907.
M. A. BEARD.
QUICK ACTING BRACE CHUCK.
APPLICATION FILED MAY 6, 1907.
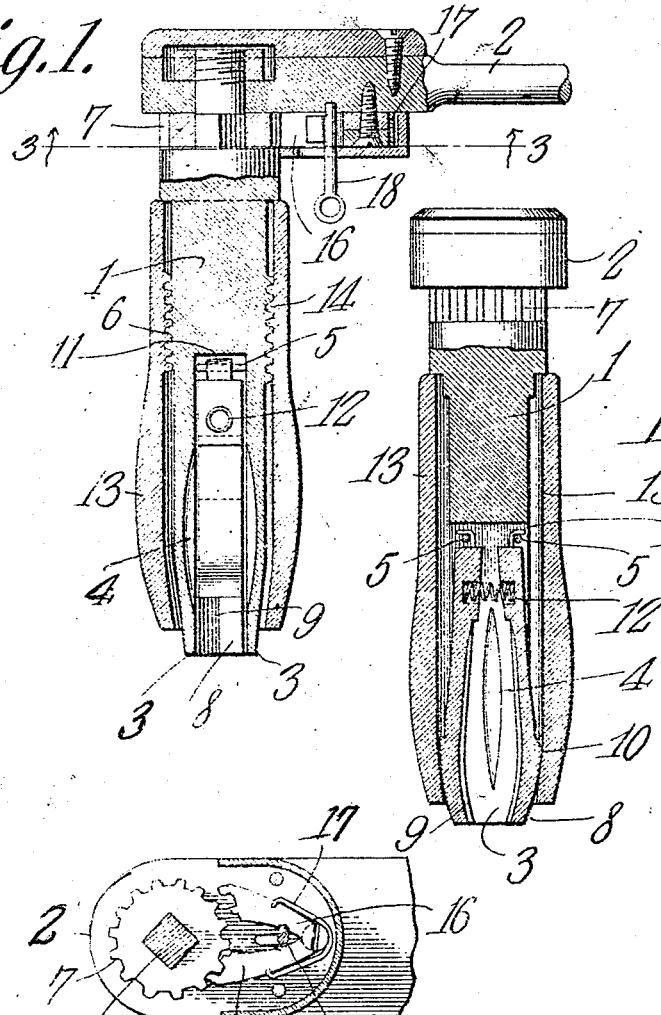
*Michael A. Beard,*
INVENTOR
WITNESSES:
By *C. A. Snow & Co.*
ATTORNEYS

UNITED STATES PATENT OFFICE.

MICHAEL A. BEARD, OF CABOOL, ARKANSAS.

QUICK-ACTING BRACE-CHUCK.

No. 875,493.   Specification of Letters Patent.   Patented Dec. 31, 1907.

Application filed May 6, 1907. Serial No. 372,171.

*To all whom it may concern:*

Be it known that I, MICHAEL A. BEARD, a citizen of the United States, residing at Cabool, in the county of Cleveland and State of Arkansas, have invented a new and useful Quick-Acting Brace-Chuck, of which the following is a specification.

This invention has relation to quick-acting brace chucks and it consists in the novel construction and arrangement of its parts as hereinafter shown and described.

The object of the invention is to provide a spindle for the brace which is adapted to receive between spaced portions the chuck jaws and which is provided with an interrupted thread which is adapted to engage a similar thread located in the chuck socket. The chuck jaws are provided upon their outer sides with shoulders which lie in alinement with the smooth or interrupted portions of the thread of the spindle while the chuck socket is provided in its interior with shoulders which lie in longitudinal alinement with the smooth portions of the interior surface of the said socket. The opening between the spaced portions of the spindle is provided with cross pins which are adapted to engage shanks at the ends of the chuck jaws and a spring is interposed between the said jaws and is under tension with a tendency to hold the same away from each other.

By providing a quick-acting brace chuck the parts may be quickly adjusted to receive bit shanks of different sizes and when the said shanks are inserted between the chuck jaws the chuck socket may be turned into engagement with the spindle for firmly holding the bit shank between the chuck jaws. The spindle is pivotally mounted upon the brace proper and a ratchet mechanism is provided whereby the said spindle may be rotated in one direction only when a reciprocatory rotary movement is imparted to the brace.

In the accompanying drawings:—Figure 1 is a vertical sectional view of the chuck. Fig. 2 is a similar view cut at a right angle to the view shown in Fig. 1, and Fig. 3 is a horizontal sectional view cut on the line 3—3 of Fig. 1.

The spindle 1 is journaled at the end of the crank of the brace 2. Said spindle is provided at its outer end with the oppositely disposed spaced portions 3 which are provided upon their inner sides with the longitudinally disposed grooves 4. The cross pins 5 are secured at their ends in the portions 3 and traverse the space between the same. The inner portion of the spindle 1 is provided with an interrupted screw thread 6, the interruptions of which occur in longitudinal alinement with the space between the portions 3 and the thread portions are therefore, in alinement with the outer side of the said spaced portions 3. The inner end of the spindle 1 is provided with a ratchet wheel 7. The chuck jaws 8 are provided upon their inner faces with the longitudinally disposed grooves 9. Each said jaw is provided at its upper portion with a lateral swell which terminates in a shoulder 10 located upon the outer side of the jaw. The lower end of each jaw is provided with a shank 11 and the said shanks are adapted to engage and pass under the cross pins 5 and hold the jaws 8 against longitudinal movement with relation to the spindle but which permit the outer ends of the jaws to swing laterally.

The spring 12 is interposed between the jaws 8 and is under tension with a tendency to hold the outer ends thereof spread apart. The chuck socket 13 is provided upon its interior with the interrupted thread 14 and the smooth surfaces 15 from the sections at which the thread is interrupted. The thread 14 is adapted to engage the thread 6 or the said thread 14 may slip longitudinally along the spaces or interruptions of the thread 6. By this arrangement it is apparent that a quick-acting brace chuck is provided which may be speedily adjusted to receive bit shanks of varying sizes. In as much as the surfaces 15 are in alinement with the smooth sections of the interior of the chuck socket 13 and the shoulders 10 of the chuck jaws 8 extend transversely across the plane in which the smooth sections or interruptions of the thread 6 lie the chuck socket cannot be disengaged entirely or removed from the spindle 1 by a straight longitudinal movement. It requires a longitudinal movement sufficient to carry the thread 14 beyond the thread 6, then the socket 13 must be given a quarter turn in order to carry the thread 13 opposite the spaced portions 3 and from under the shoulders 10 of the chuck jaws, when the said chuck socket may be slipped off the shank.

The pawls 16 are pivoted upon the brace 2 and are held toward each other and normally in contact with the ratchet wheel 7 by the spring 17. The key 18 is located between the said pawls and may be turned so as to throw one or the other of the pawls out of engagement with the said ratchet wheel. When this is done a continuous rotary movement in one direction may be imparted to the spindle while the brace is rotated alternately in opposite directions. The chuck jaws 2 receive and retain a bit shank in the usual manner and are held in contact therewith by the chuck socket 13 when the thread 14 thereof is in engagement with the screw thread 6.

Having described my invention what I claim as new and desire to secure by Letters-Patent is:—

A quick acting chuck socket comprising a spindle having an interrupted thread and spaced portions, said spaced portions being in longitudinal alinement with the thread portions, cross pins lying between the spaced portions, chuck jaws having hooked shanks which pivotally and detachably engage the cross pins, said jaws having shoulders upon their outer sides and a chuck socket having upon its interior an interrupted thread for engagement with the thread of the spindle.

In testimony that I claim the foregoing as my own, I have hereto affixed my signature in the presence of two witnesses.

MICHAEL A. BEARD.

Witnesses:
S. A. BRYANT,
WALTER ANDREWS.